(12) United States Patent
Holker et al.

(10) Patent No.: US 8,196,484 B2
(45) Date of Patent: Jun. 12, 2012

(54) ELECTRIC ACTUATOR

(75) Inventors: Brett C. Holker, Monticello, MN (US); Jeff Karls, Big Lake, MN (US); Jeremy R. Forbord, Mound, MN (US)

(73) Assignee: Tol-O-Matic, Inc., Hamel, MN (US)

( * ) Notice: Subject to any disclaimer, the term of this patent is extended or adjusted under 35 U.S.C. 154(b) by 460 days.

(21) Appl. No.: 12/424,780

(22) Filed: Apr. 16, 2009

(65) Prior Publication Data

US 2009/0260464 A1 Oct. 22, 2009

Related U.S. Application Data

(60) Provisional application No. 61/046,243, filed on Apr. 18, 2008.

(51) Int. Cl.
*F16H 3/06* (2006.01)
*F16H 27/02* (2006.01)
*F16H 29/02* (2006.01)
*F16H 29/20* (2006.01)

(52) U.S. Cl. ...................... 74/89.44; 74/89.23

(58) Field of Classification Search ............... 74/89.23, 74/89.32, 89.33, 89.43, 89.44; 384/13; 184/6.14
See application file for complete search history.

(56) References Cited

U.S. PATENT DOCUMENTS

| | | | |
|---|---|---|---|
| 3,132,719 A * | 5/1964 | Cole ................... | 184/65 |
| 3,331,469 A * | 7/1967 | Deflandre ............ | 184/6.14 |
| 3,815,435 A | 6/1974 | Eschenbacher et al. | |
| 3,851,541 A | 12/1974 | Ploss et al. | |
| 3,969,807 A | 7/1976 | Takizawa et al. | |
| 4,040,445 A | 8/1977 | McCormick | |
| 4,072,063 A | 2/1978 | Nauman | |
| 4,198,872 A | 4/1980 | Metz | |
| 4,250,762 A | 2/1981 | Weatherby | |
| 4,266,437 A | 5/1981 | Obergfell | |
| 4,286,793 A | 9/1981 | Ploss et al. | |
| 4,369,011 A | 1/1983 | Ploss | |
| 4,393,319 A | 7/1983 | Bock | |
| 4,438,662 A | 3/1984 | Walton et al. | |
| 4,489,248 A | 12/1984 | Petersen | |
| 4,496,865 A | 1/1985 | Allen et al. | |
| 4,521,707 A | 6/1985 | Baker | |
| 4,614,128 A | 9/1986 | Fickler | |
| 4,643,710 A | 2/1987 | Troutner | |
| 4,664,136 A | 5/1987 | Everett | |
| 4,860,638 A | 8/1989 | Hosono et al. | |
| 4,987,822 A | 1/1991 | Stoll | |
| 5,053,685 A | 10/1991 | Bacchi | |
| 5,087,845 A | 2/1992 | Behrens et al. | |
| 5,099,161 A | 3/1992 | Wolfbauer, III | |
| 5,121,042 A | 6/1992 | Ako | |
| 5,130,585 A | 7/1992 | Iwamatsu et al. | |
| 5,142,172 A | 8/1992 | Horikoshi et al. | |
| 5,234,386 A | 8/1993 | Nagai et al. | |
| 5,334,897 A | 8/1994 | Ineson et al. | |
| 5,363,741 A | 11/1994 | Takada et al. | |
| 5,445,045 A | 8/1995 | Nagai et al. | |
| 5,491,372 A | 2/1996 | Erhart | |
| 5,499,547 A | 3/1996 | Nagai et al. | |
| 5,557,154 A | 9/1996 | Erhart | |

(Continued)

*Primary Examiner* — Justin Krause
(74) *Attorney, Agent, or Firm* — Dorsey & Whitney LLP

(57) ABSTRACT

An electrically powered linear actuator having a thrust assembly, a motor with a hollow rotor surrounding at least a portion of the thrust assembly, and a lubricant passage for replenishing lubricant to the force transmitting components of the actuator.

18 Claims, 8 Drawing Sheets

U.S. PATENT DOCUMENTS

| | | | |
|---|---|---|---|
| 5,606,902 A | 3/1997 | Hosono et al. | |
| 5,614,778 A | 3/1997 | Terao et al. | |
| 5,617,772 A | 4/1997 | Hosono et al. | |
| 5,637,940 A | 6/1997 | Nagai et al. | |
| 5,676,016 A | 10/1997 | Nagai et al. | |
| 5,685,390 A | 11/1997 | Chikuma et al. | |
| 5,689,994 A | 11/1997 | Nagai et al. | |
| 5,747,896 A | 5/1998 | Nagai et al. | |
| 5,761,960 A | 6/1998 | Nagai et al. | |
| 5,784,922 A | 7/1998 | Ozaki et al. | |
| 5,796,187 A | 8/1998 | Nagai et al. | |
| 5,799,543 A | 9/1998 | Nagai et al. | |
| 5,809,831 A | 9/1998 | Nagai et al. | |
| 5,884,549 A | 3/1999 | Hosono et al. | |
| 5,912,520 A | 6/1999 | Kobayashi et al. | |
| 5,966,988 A | 10/1999 | Aiso et al. | |
| 6,000,292 A | 12/1999 | Nagai et al. | |
| 6,003,428 A | 12/1999 | Mundie et al. | |
| 6,067,868 A | 5/2000 | Nakamura et al. | |
| 6,081,051 A | 6/2000 | Kitazawa et al. | |
| 6,145,395 A | 11/2000 | Swanson et al. | |
| 6,177,743 B1 | 1/2001 | Hartramph et al. | |
| 6,186,770 B1 | 2/2001 | Ziv-Av | |
| 6,223,971 B1 | 5/2001 | Sato | |
| 6,278,077 B1 | 8/2001 | Cecil | |
| 6,357,100 B2 | 3/2002 | Speller et al. | |
| 6,362,547 B1 | 3/2002 | Peterson et al. | |
| 6,531,798 B1 | 3/2003 | Palmero | |
| 6,603,228 B1 | 8/2003 | Sato | |
| 6,718,837 B2 | 4/2004 | Sato et al. | |
| 6,756,707 B2 | 6/2004 | Hochhalter | |
| 7,541,707 B2 | 6/2009 | Hochhalter et al. | |
| 7,634,952 B2 * | 12/2009 | Chen et al. | 74/89.44 |
| 2002/0170369 A1 * | 11/2002 | Yabe | 74/89.44 |
| 2004/0120615 A1 | 6/2004 | Chase | |

* cited by examiner

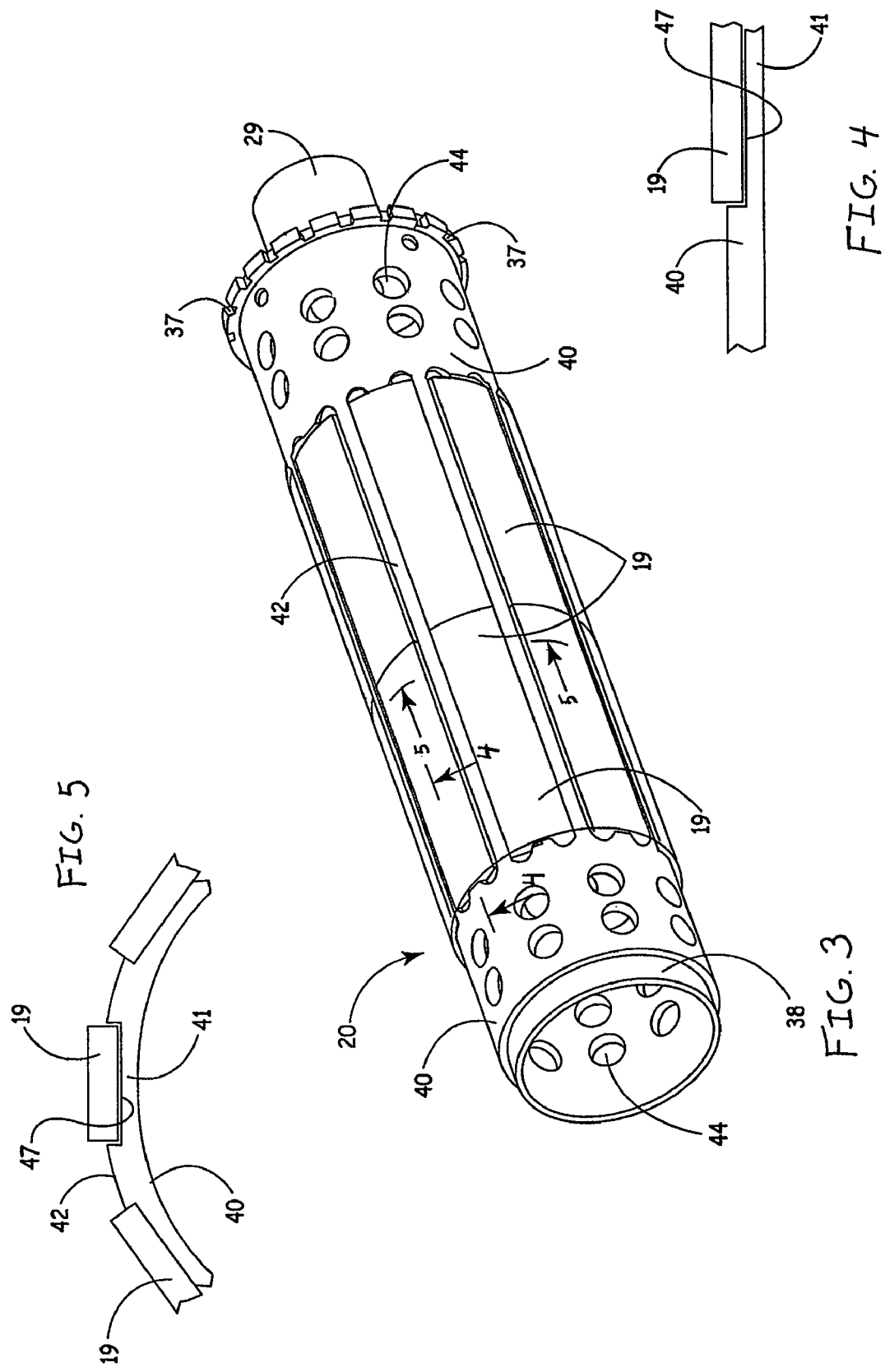

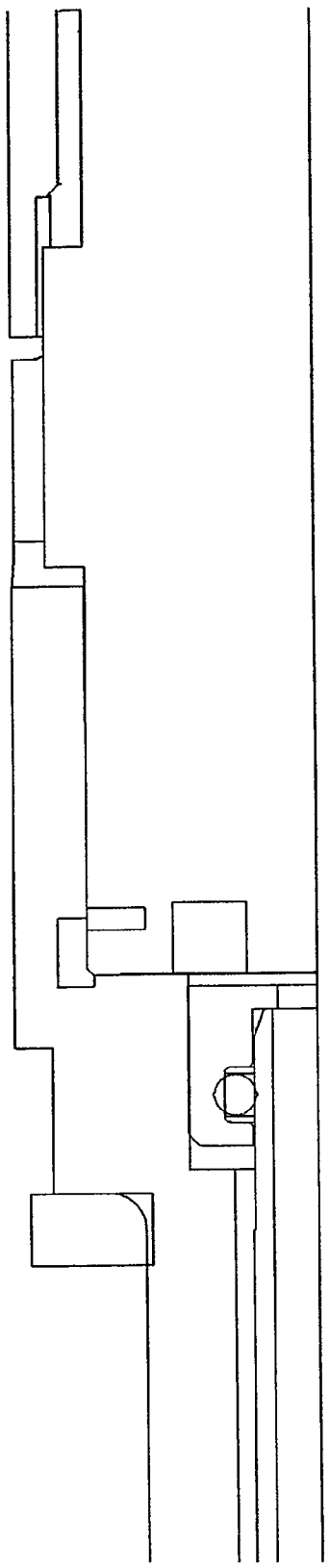
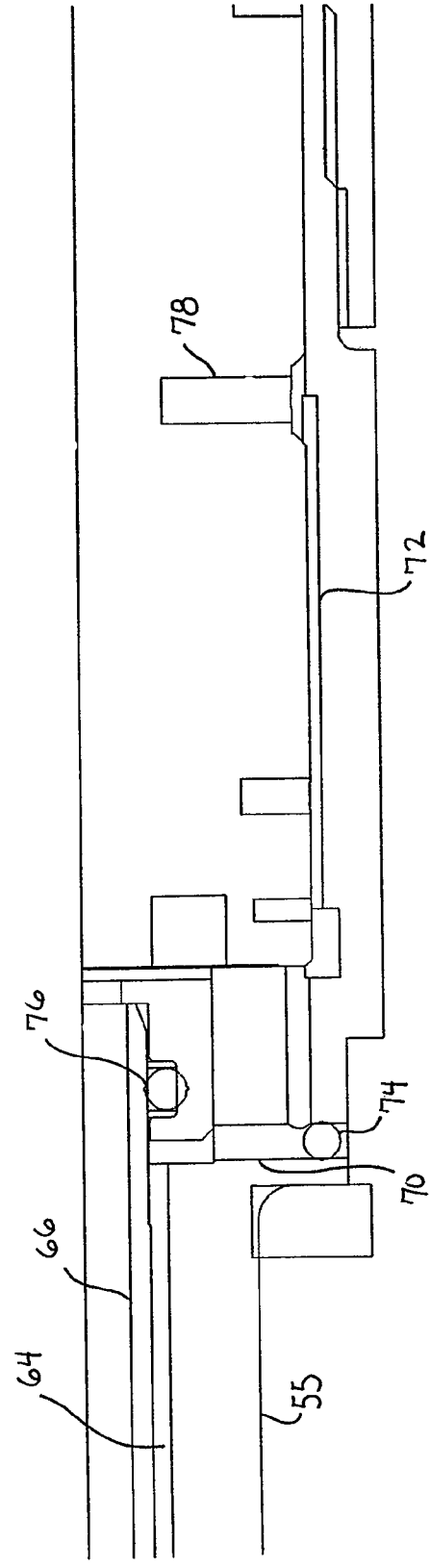
FIG. 10

ELECTRIC ACTUATOR

CROSS-REFERENCE TO RELATED APPLICATION(S)

This application claims priority to U.S. provisional patent application Ser. No. 61/046,243, filed Apr. 18, 2008, which is incorporated herein by reference in its entirety.

FIELD OF THE INVENTION

The present disclosure relates generally to an electrically powered linear actuator and more particularly to an electrically powered actuator having a lubricant passage and adapted for a variety of robotic or other applications. The actuator of the present disclosure has particular application to the control of robotic, pedestal, or fixture welding guns and specifically, welding guns such as those utilized in various industries such as the automotive industry, to the injection molding field or other applications requiring a short stroke, to the actuation of clamping fixtures and the like in various industries such as the automotive industry, and to the linear movement of various apparatus requiring highly accurate positioning, among others.

BACKGROUND OF THE INVENTION

Various industries, and particularly the manufacturing industry, among others, have utilized linear actuators to control the movements of automated welding guns, automated clamping fixtures, and the like. Specifically, in the automotive industry and various other industries, actuation and control of welding guns and clamping fixtures and controlled linear movement of other fixtures and devices have been accomplished using fluid actuators such as pneumatic or hydraulic actuators. While fluid actuators have functioned reasonably well for these purposes, they inherently embody various limitations. One, because of the possibility of leaks and failure of seals, etc., there is always the concern of contamination of the worksite by a leaking fluid. Second, fluid actuators necessarily require a source of pressurized fluid and thus a fluid supply system. This leads to significant maintenance and other costs. Third, limitations sometimes exist with respect to the accuracy and positioning of linear movement and the adjustability of such movement.

Various electric actuators in the prior art are built with an integral motor having a hollow rotor. Screw/nut mechanisms used in prior art actuators are typically contained within the hollow rotor. Access, therefore, to the nut component is restricted by the fact that the nut is contained within the centermost part of the actuator. Life of an actuator is determined by the life of these force transmitting components, e.g., the screw and nut. The life of the actuator may be extended by the performance of periodic maintenance, such as replenishing lubrication for the screw/nut. In the various prior art actuators, for example, those having an integral motor or hollow motor configuration as well as those having a conventional configuration, replenishing lubrication is very difficult, requiring the actuator to be partially or completely disassembled to access the components needing lubrication. In some cases, special tools are required to be purchased to access the lubrication points. In some actuators, replenishing lubrication is simply not possible.

Accordingly, there is a need in the art for an improved actuator which overcomes the deficiencies and limitations of the prior art, and in particular, an improved actuator which is designed for use in controlling the movement of, and accommodating the loads associated with, welding guns, clamping fixtures, injection molding fixtures, and various other fixtures and devices, as well as for use in numerous other industrial applications as will be recognized by those skilled in the art. A need also exists for an improved actuator with means for replenishing lubrication of the force transmitting components, which may include a lubricant passage to the internal, threaded nut.

BRIEF SUMMARY OF THE INVENTION

The present disclosure relates to an electric actuator with a lubricant passage having particular application to the actuation of welding guns, clamping fixtures, or the like and to injection molding and other fixtures and devices requiring relatively short actuation strokes and highly accurate positioning. More specifically, the electric actuator of one embodiment utilizes a hollow shaft motor which rotates either an externally threaded shaft or an internally threaded nut to provide controlled linear movement to a thrust or load transfer member which is in turn connected with a work piece. In one embodiment, the rotor of the hollow shaft motor is provided with an inertia reducing rotor and a unique magnet mounting arrangement which facilitates a high torque and thus high thrust actuator with minimal inertia limitations. In this embodiment, the rotor rotates the threaded shaft which results in linear movement of the threaded nut, and thus the connected thrust member. The rotor together with the thrust member and threaded shaft can be provided with improved bearing and support members to provide the thrust member with improved axial and radial stability.

In a further embodiment, the actuator includes means for lubricating the force transmitting components, such as but not limited to, the screw/nut. The means for lubricating the force transmitting components provide a mechanism for replenishing lubrication without accessing the internal components of the actuator. In some embodiments, the actuator includes a lubricant passage for delivering lubricant from an external lubricant access point of the actuator to the screw/nut.

Accordingly, the various embodiments of the present disclosure provide an improved actuator for welding guns, clamping fixtures, injection molding fixtures, and other fixtures and devices. Similarly, the various embodiments of the present disclosure provide means for replenishing lubrication to the force transmitting components of the actuator.

While multiple embodiments are disclosed, still other objects and embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the present invention, it is believed that the invention will be better understood from the following description taken in conjunction with the accompanying Figures, in which:

FIG. 3 is an isometric view of a rotor of an actuator in accordance with an embodiment of the present disclosure.

FIG. 4 is a view taken along the section line 4-4 of FIG. 3.

FIG. 5 is a view taken along the section line 5-5 of FIG. 3.

FIG. 10 is a cross-section view of the engagement between the thrust tube and the nut of an actuator in accordance with an embodiment of the present disclosure, illustrating a lubricant passage.

DETAILED DESCRIPTION

The present disclosure relates to novel and advantageous actuators for use in providing controlled and accurate linear movement to a work piece. Particularly, the present disclosure relates to novel and advantageous actuators having a lubricant passage for replenishing lubrication to the force transmitting components of the actuator. Although the actuators of the present disclosure have applicability to a variety of work pieces and in a variety of industries, they may have particular application to the actuation of welding guns, clamping fixtures, injection molding fixtures and any application in which controlled and accurate linear motion is required. One embodiment in accordance with the present invention has particular use in an application with a relatively short, but highly accurate, thrust stroke, although its use is not limited to that application.

In describing the actuator embodiments of the present disclosure, the terms "proximal" and "distal" will sometimes be used to define directions/orientations relative to the actuator. Specifically, the term "distal" shall mean the direction which is toward the work piece connection end of the actuator, while the term "proximal" shall mean the direction which is away from work piece connection end of the actuator.

Figure 1:
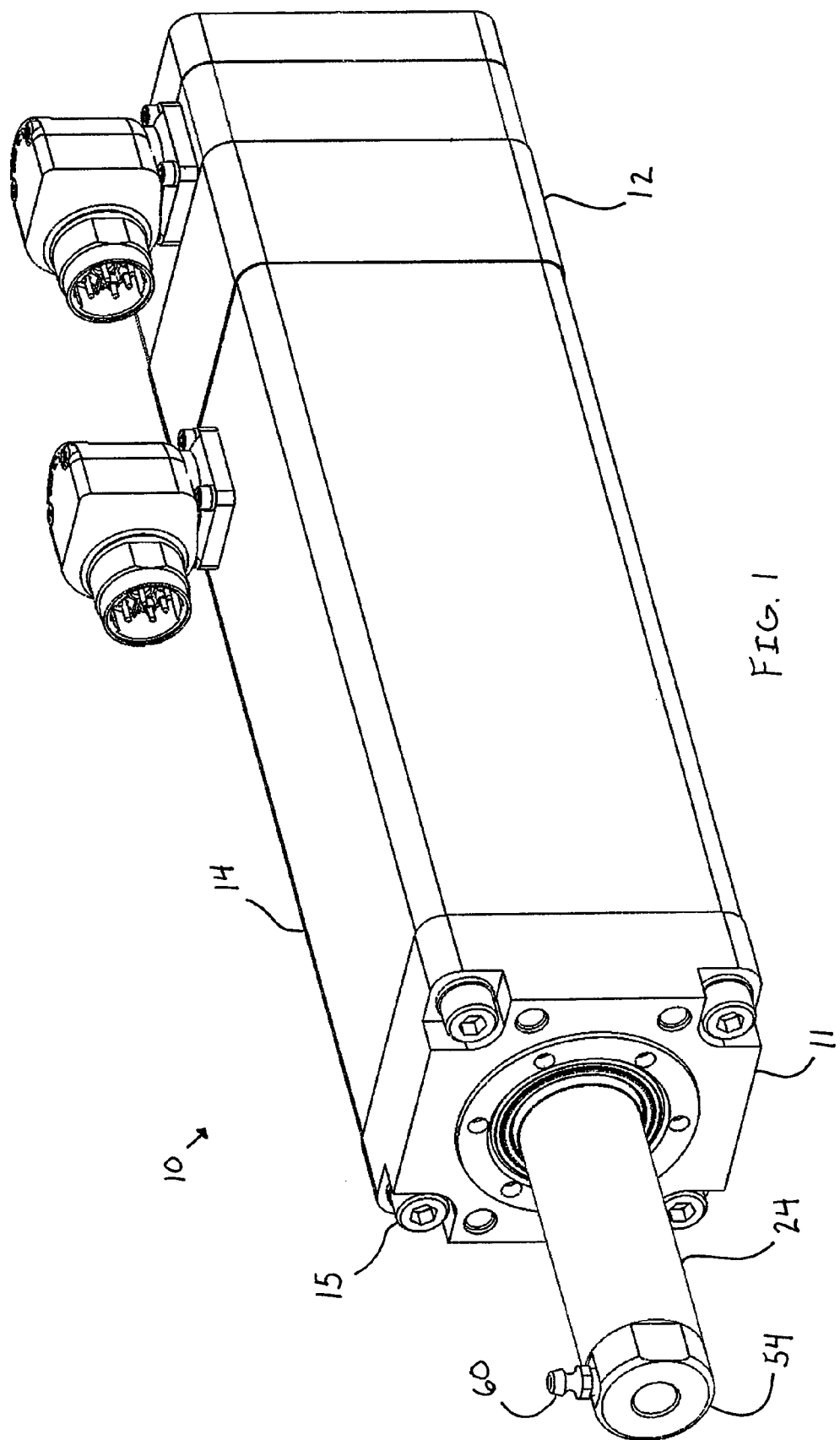
FIG. 1 is an isometric view of an actuator in accordance with an embodiment of the present disclosure.
Figure 2:
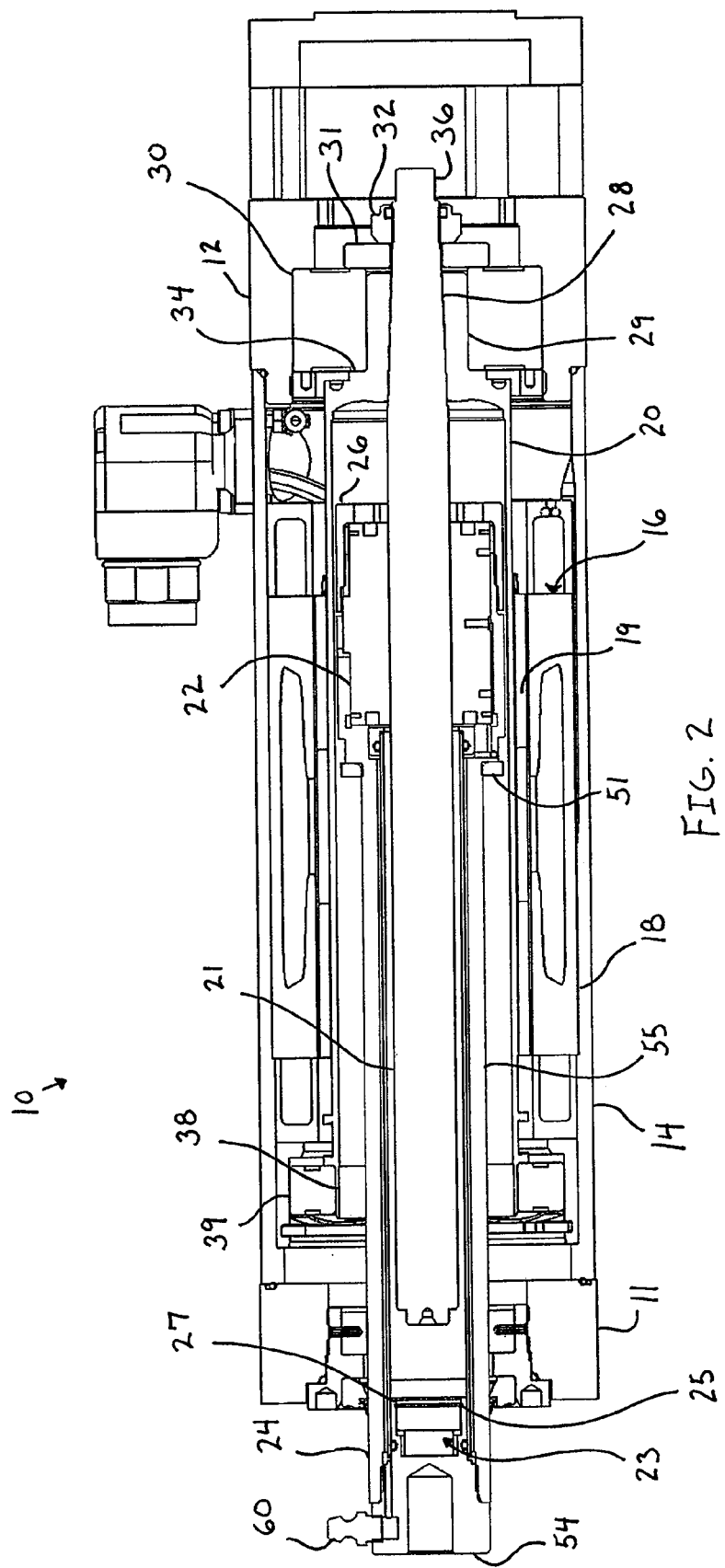
FIG. 2 is a cross-section view of an actuator in accordance with an embodiment of the present disclosure.

FIGS. 1 and 2 illustrate isometric and sectional views, respectively, of one embodiment of an electric actuator of the present disclosure. In general, the various embodiments characterize an actuator as utilizing what is often referred to in the art as a hollow shaft motor comprising motor windings and a rotor which surround a centrally located linear thrust mechanism. However, such a motor is not required to practice many features of the invention.

The actuator 10 of the embodiment of FIGS. 1 and 2 may include an actuator housing comprised of a distal head end or block 11, a proximal head end or block 12, and a centrally positioned peripheral housing portion 14. As shown, the housing section 14 is positioned between the end blocks 11 and 12 and may be retained in that position between the blocks 11 and 12 by a plurality of elongated threaded members 15 (FIG. 1) in a conventional manner. A hollow shaft motor 16 (FIG. 2) comprising a plurality of motor windings 18, a plurality of motor magnets 19, and a rotor 20 can be positioned between the end blocks 11 and 12 and radially inwardly of the housing portion 14.

In one embodiment, an externally threaded, elongated shaft or lead screw 21 and an internally threaded nut 22 together comprise a linear thrust mechanism. The linear thrust mechanism, comprised of the screw 21 and the nut 22, can be positioned radially inwardly from the rotor 20 and may function to convert rotational motion of the rotor 20 to linear movement of a thrust tube or load transfer member 24. As shown, the rotor may surround a substantial portion of the thrust mechanism.

More specifically, the elongated, externally threaded screw 21 may include a main, externally threaded section, which may be provided with continuous threads along a substantial portion of its length. As used herein, the term "thread" or "threaded" to define the threaded section of the screw 21 may include any conventional or other threads such as ACME threads, roller screw threads, ball nut threads, or any other suitable means to convert rotational motion to linear motion.

The proximal end of the screw 21 may include a tapered section 28 which tapers inwardly toward the proximal end. The proximal end may comprise a reduced diameter end section 36 designed for connection to a rotation sensing portion of a rotary encoder. The tapered section 28 may extend through a hub 29 and may be operably connected for rotation with such hub 29. The hub 29 can include an inner surface having a taper similar to the taper of the section 28. A thrust bearing 30 may be positioned radially outwardly from the hub 29 and may function to mount and support the hub 29 and thus the proximal end of the screw 21 within the end block 12. The tapered section 28 and the hub 29 may be retained relative to the bearing 30 by the retaining washer 31 and the nut 32. Specifically, the bearing 30 may be captured between a shoulder portion 34 of the hub 29 and the washer 31. In some embodiments, the rotor 20 and hub 29 may comprise a single, integrated component. In other embodiments, the rotor 20 and hub 29 may be separate components, as described in detail in U.S. application Ser. No. 11/031,539, filed Jan. 7, 2005, titled "Electric Actuator," and published as U.S. Publ. No. 2005/0253469, the entirety of which is hereby incorporated by reference herein. In such an embodiment, the proximal end of the rotor 20 can be connected with an axially extending rotor mounting portion of the hub 29. This can be a rigid connection so that rotation of the rotor 20 causes corresponding rotation of the hub 29 and the screw 21.

In some embodiments, an outer peripheral edge of the hub 29 may include a plurality of notches 37 (FIG. 3) or recessed areas. These notches 37 or areas can be accessible to the end of a screwdriver or other tool through an access hole in the end block 12 to provide a manual override feature to the actuator. If a crash or lockup occurs, or if motor power is lost, the end of a screwdriver or other tool can be inserted through the access hole to engage the notches 37 and manually rotate the hub 29, and thus the rotor 20. This rotation releases the lockup and permits the actuator to resume operation.

A rotary encoder or other similar means may be mounted to the end section 36 of the threaded screw 21, either directly or through a coupling. For example, a selectively connectable encoder housing portion may be provided. The encoder housing portion may be provided with an encoder. Such encoder may comprise any one of a variety of encoder models and configurations. The encoder housing portion can be selectively connectable to the actuator by threaded connections or other conventional connection means. If needed, a coupling member can be provided between the proximal end 36 of the screw 21 and the positioning sensor or rotation sensing member of the encoder. Because of axial and other forces being applied to the screw 21 during operation, it may be desirable for the body of the encoder to be connected to the actuator housing through a flexible mount, such as flexible mounts known in the art. In one embodiment, the encoder can be a hollow shaft encoder (either incremental or absolute) having a central rotation sensing member or portion mounted directly onto the proximal end extension 36 of the screw 21.

The motor 16 may be a hollow shaft motor comprising a centrally located, hollow rotor 20 and one or more stationary motor windings 18. The windings 18 can be positioned radially outwardly of the rotor 20 and may be fixed relative to the actuator housing. The rotor 20 may be a generally cylindrical member having a generally cylindrical outer surface and a hollow cylindrical interior surface. The distal end of the rotor 20 can be provided with a recessed portion 38 to accommodate a bearing 39. The bearing 39 may be an axial floating bearing which supports and stabilizes the distal end of the rotor 20 relative to the housing 14. Because the bearing 39 is allowed to float axially, it accommodates any thermal expansion of the rotor 20 during operation.

As illustrated in FIGS. 3-5, the central portion of the rotor 20 may be provided with a plurality of motor magnets 19. As shown, the magnets 19 may be mounted so that they extend axially along an outer surface of the rotor 20 between its proximal and distal ends 40. In one embodiment, the magnets 19 can be inlaid within an outer surface portion of the rotor 20. Specifically, axially extending portions of the outer surface of the central portion 41 of the rotor 20 may be removed by machining or the like to form axially extending channels or grooves 47 around the cylindrical periphery of the rotor 20. These channels or grooves 47 permit the magnets 19 to be inlaid within these channels or grooves 47 in the outer surface of the rotor 20. As shown, this may provide the rotor 20 with thicker wall sections at the proximal and distal ends 40 extending axially outwardly on either side of the magnets 19 and thinner wall sections 41 (FIGS. 4 and 5) in the channel areas where the magnets are mounted. This structure may also provide a radially thicker, axially extending rib or section 42 between adjacent magnets 19 and between adjacent channels 47. This magnet mounting structure can enable the mass of the rotor 20 to be reduced in the area of the thinner walls 41, while still providing sufficient material in the form of the axially extending ribs 42 to preclude or limit core saturation of the magnets. These ribs 42 can provide at least two functions. First, they can facilitate simple assembly without additional tooling for alignment. Second, they can provide additional material to reduce or prevent core saturation due to the high flux of the magnets. Because the rotor wall thickness in the area of the channels 47 is very thin, without this additional material of the ribs 42, saturation is likely to occur. This added material of the ribs also aids in prevention of flux leakage into the rotor core.

Accordingly, the rotor structure in accordance with one embodiment of the present disclosure may include a plurality of elongated magnets 19 mounted to the exterior of the rotor 20 with such magnets 19 being circumferentially spaced from one another and with the thickness of the rotor wall portions 41 in the area of the magnets 19 being thinner than the rotor wall portions 42 in the area between the side edges of the circumferentially spaced magnets 19. In one embodiment, the magnets 19 can be partially inlaid relative to the areas 42. Thus, the inner surfaces of the magnets 19 may be positioned radially inwardly of the outer surfaces of the areas 42, and the outer surfaces of the magnets 19 may be positioned radially outwardly of the outer surfaces of the areas 42.

In a further embodiment, the outer or proximal and distal ends of the rotor can be provided with a plurality of holes or apertures 44 extending through the wall sections 40 for the purpose of reducing inertia of the rotor 20. This, in turn, can reduce the amount of torque required to accelerate and/or decelerate the rotor 20. If desired, the holes 44 can be eliminated.

The linear motion or thrust assembly of one embodiment of an electric actuator of the present disclosure may include the thrust tube or load transfer member 24, the threaded nut 22, and the threaded screw 21. Other embodiments of a thrust assembly are described in U.S. application Ser. No. 11/031,539, which was previously incorporated herein. Still further, the thrust assembly may include any other suitable connection mechanism known in the art. In some embodiments, a cushion or impact reducing member 51 can be provided on the distal side of the nut 22. This member 51 may be an O-ring or other suitable compressible material. During operation, this member 51 may prevent or limit damage to the nut 22 in the case of a runaway or during power up procedures.

The nut 22 may be connected with the proximal end of the thrust tube 24. In one embodiment, the nut 22 may be held in a pocket of the thrust tube located between the proximal end of the thrust tube 24 and a locking end cap 26, which connects with the proximal end of the thrust tube 24. As such, in some embodiments, the nut 22 may be held entirely within this pocket of the thrust tube 24 and the locking end cap 26. The nut 22 may include internal threads which mate with the external threads on the outer surface of the screw 21. As described above with respect to the screw 21, the internal threads of the nut 22 and the external threads of the screw 21 may be any conventional or other threads such as ACME threads, roller screw threads, ball or ball nut threads, or any other suitable means to convert rotational motion to linear motion. In one embodiment, the threads of the nut 22 and the screw 21 can be recirculating ball threads.

As described above, the proximal end of the thrust tube 24 can be connected with the nut 22. Accordingly, the nut 22 and the thrust tube 24 move axially in unison along the screw 21. The distal end of the thrust tube 24 may include a work piece connection member 54 to which a work piece may be connected. The proximal end of the work piece connection member 54 may be provided with a recessed area 23. This recessed area 23 may include compliant or cushioning means, which may be, but is not limited to an elastomeric disc or puck 25 or other depressible mechanism or spring type member, to cushion impact between the distal end of the screw 21 and the work piece connection member 54. The cushioning means may further include rigid disc or puck 27, comprising for example metal, metal alloy, or other suitable material, that protects the elastomeric disc or puck 25 from wear and tear due to the impact between the distal end of the screw 21 and the work piece connection member 54. Such impact cushioning may be particularly advantageous during power up or in the case of a runaway. In such situations, the compliant means can assist in preventing or reducing lockup of the actuator and possible damage to the nut 22.

The thrust tube 24 may include an elongated, outer hollow tubular portion 55, which extends between its proximal and distal ends. The tubular portion may have a hollow interior to receive and accommodate the threaded lead screw 21. In further embodiments, the exterior of the tube 55 can be provided with a pair of diametrically opposed anti-rotation flat portions, as described in U.S. application Ser. No. 11/031,539, which was previously incorporated herein. These flat portions may extend the length of the tubular portion 55 and engage corresponding inner flat surfaces in the end block 11 and corresponding inner flat surfaces in a guide bushing to prevent the thrust tube 24, and thus the nut 22, from rotating.

As stated above, life of an actuator is determined by the life of the force transmitting components, e.g., the screw and nut.

The life of the actuator may be extended by the performance of periodic maintenance, such as replenishing lubrication for the screw/nut. After a certain amount of time or a certain amount of usage of the actuator, the initial lubrication may oxidize or be contaminated by particles that are shed by components in constant contact with each other. In the various prior actuators, replenishing lubrication is very difficult, requiring the actuator to be partially or completely disassembled to access the components needing lubrication. In some cases, special tools are required to be purchased to access the lubrication points. In some prior art actuators, replenishing lubrication is simply not possible.

As such, in one embodiment, as illustrated in FIGS. 6-10, the actuator 10 may include means for lubricating the force transmitting components, such as but not limited to, the nut 22. The means for lubricating the force transmitting components can provide a mechanism for replenishing lubrication without accessing the internal components of the actuator. In some embodiments, the actuator may include a lubricant passage for delivering lubricant from an external lubricant access point of the actuator to the nut 22.

Figure 6:
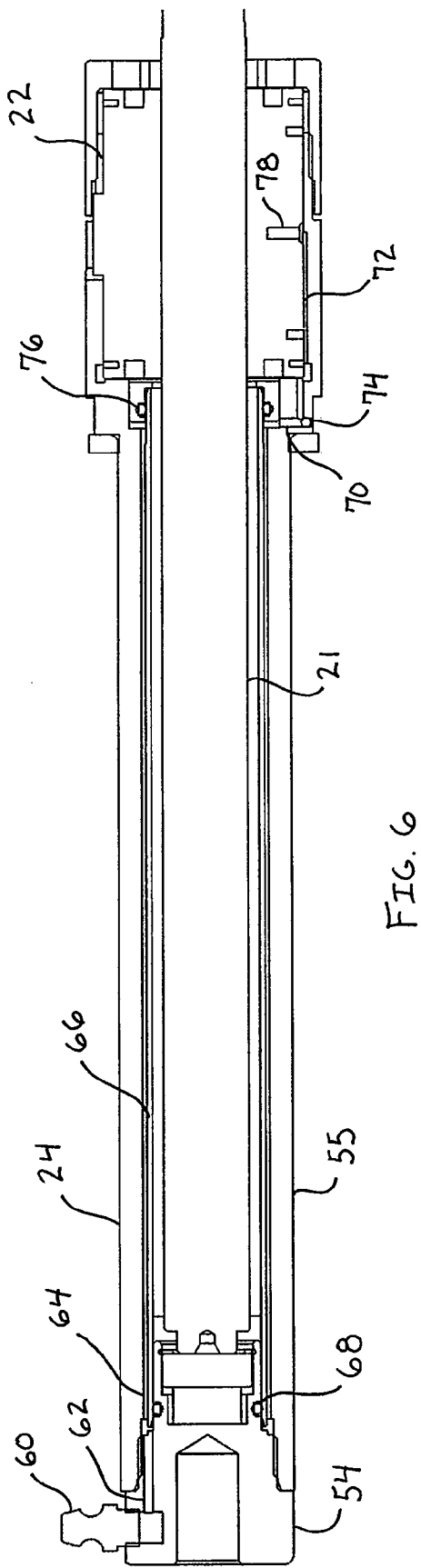
FIG. 6 is a cross-section view of a thrust assembly of an actuator in accordance with an embodiment of the present disclosure.
Figure 7:
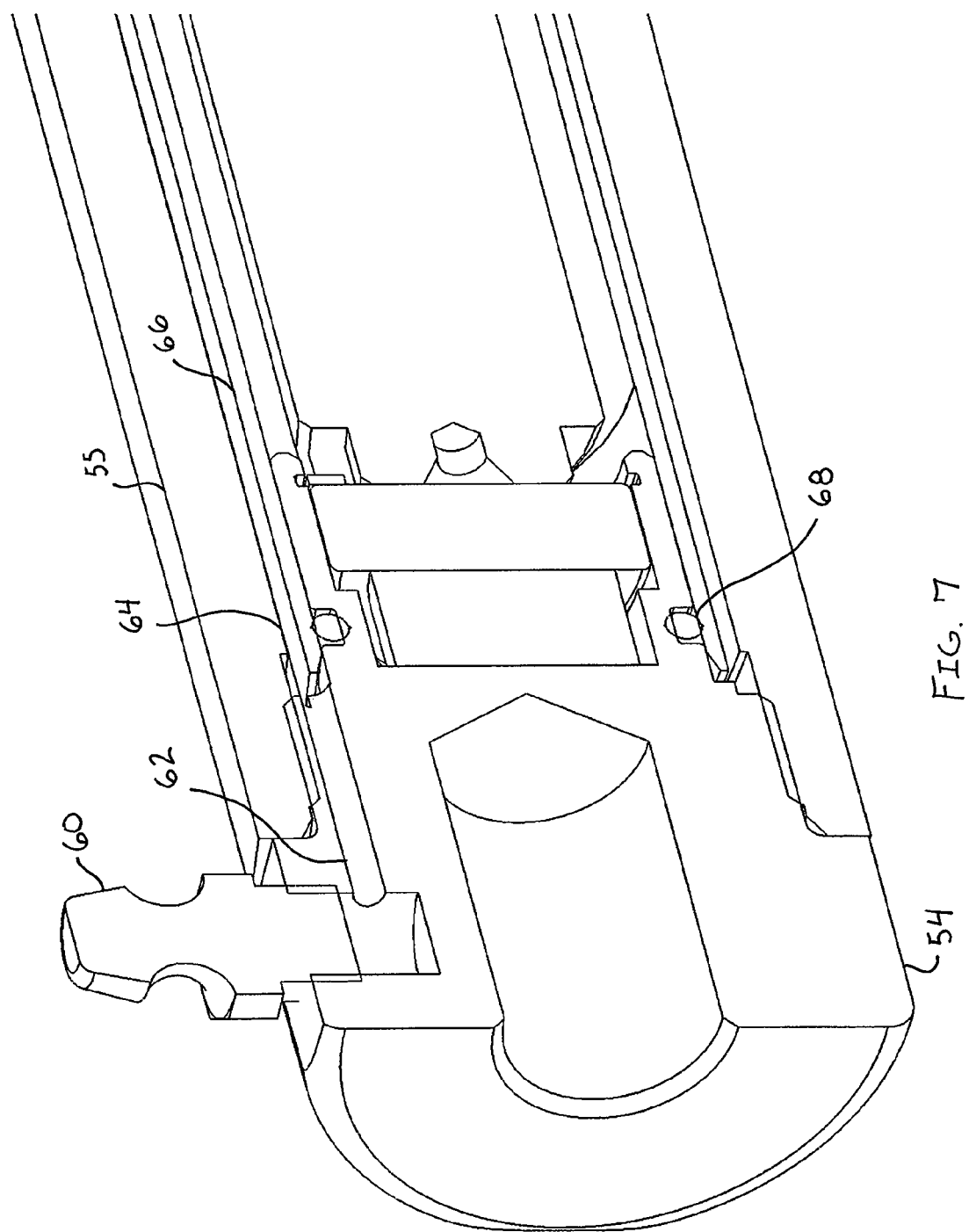
FIG. 7 is an isometric, cross-section view of a work piece connection member of an actuator in accordance with an embodiment of the present disclosure, illustrating a lubricant passage.
Figure 8:
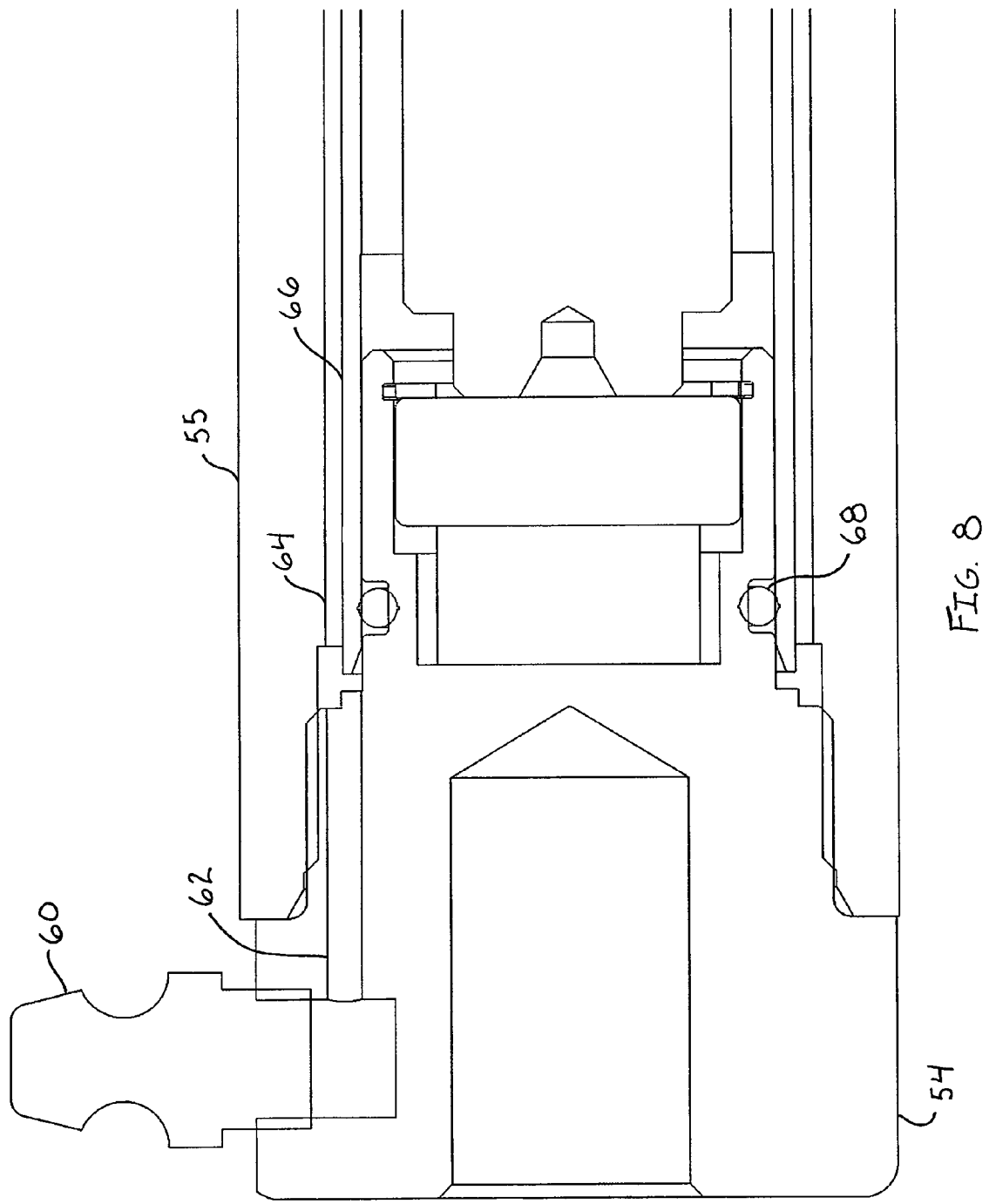
FIG. 8 is a cross-section view of a work piece connection member of an actuator in accordance with an embodiment of the present disclosure, illustrating a lubricant passage.

With reference to FIGS. 6-8, the external lubricant access point may be an access fitting 60, which may be configured for attachment to any number of various suitable lubrication tools known in the art. In one embodiment, the access fitting 60 may be located at or near the distal end of the thrust tube 24 or work piece connection member 54. As illustrated in FIGS. 6-8, the access fitting 60 is located at the distal end of the work piece connection member 54. The work piece connection member 54 may include an internal lubricant passage, or cavity, 62 between the internal end of the access fitting 60 to an internal lubricant passage 64, described in detail below, of the thrust tube 24.

As stated above, the thrust tube 24 can include an elongated, outer hollow tubular portion 55, which extends between its proximal and distal ends. The thrust tube 24 may further include an elongated, inner hollow tubular portion 66, which extends generally between the distal end of the thrust tube 24 to substantially near the nut 22. The inner tubular portion 66 may have a diameter that is less than the diameter of the outer tubular portion 55, such that the lubricant passage 64 is created between the inner and outer tubular portions. A suitable sealing member 68, such as an O-ring, may be positioned between the work piece connection member 54 and the thrust tube 24 to prevent leakage of the lubricant to outside of the lubricant passage 62, 64. Similarly, further sealing members may be positioned at other suitable locations to insure that the lubricant is substantially retained within the lubricant passage 62, 64.

Figure 9:
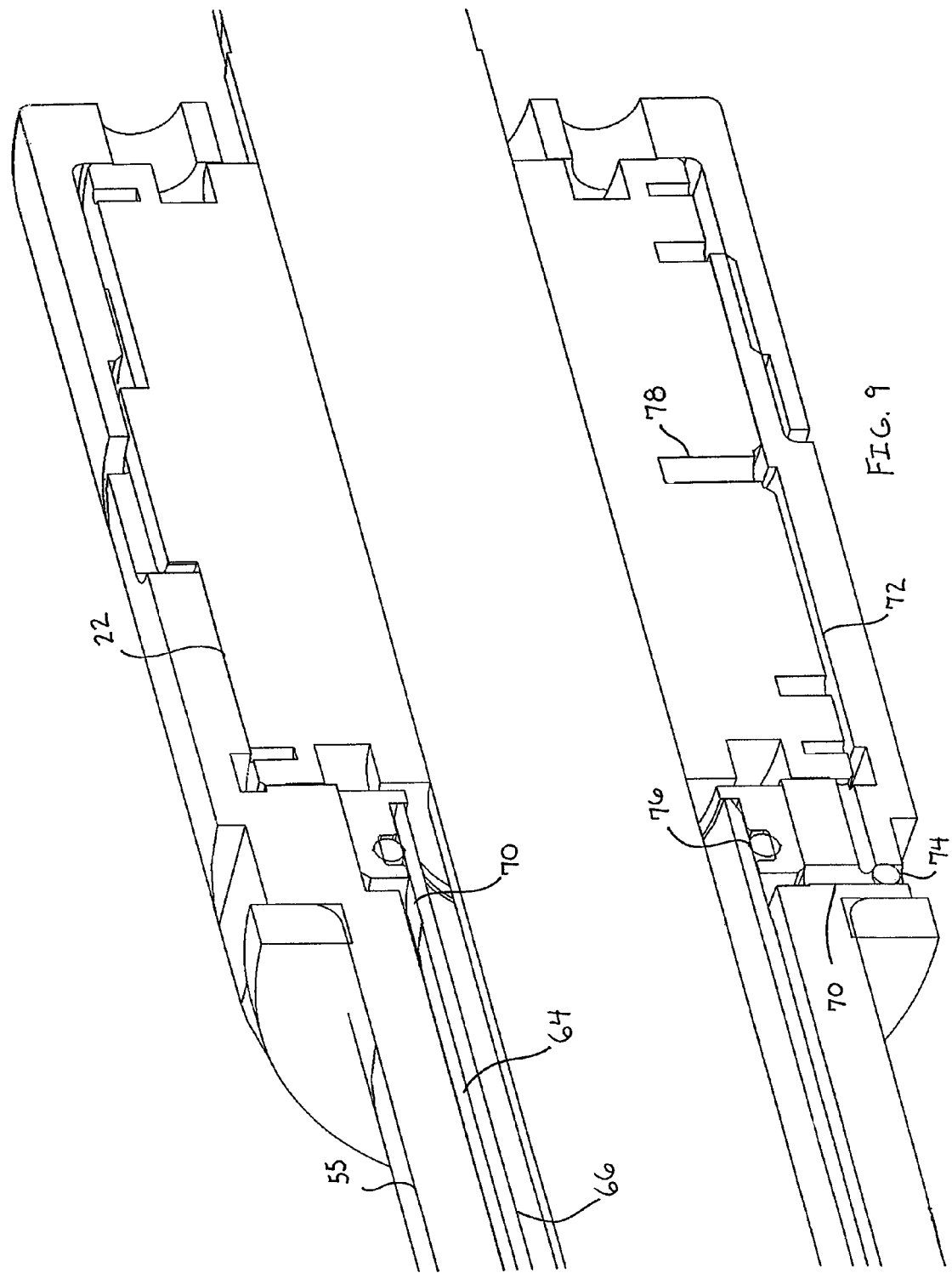
FIG. 9 is an isometric, cross-section view of the engagement between the thrust tube and the nut of an actuator in accordance with an embodiment of the present disclosure, illustrating a lubricant passage.

As illustrated in FIGS. 6, 9, and 10, near the proximal end of the thrust tube 24, the lubricant passage 64 created between the inner 66 and outer 55 tubular portions may include a portion 70 extending down and/or around the inner tubular portion 66 to engage lubricant passage 72, discussed in further detail below. Portion 70 of the lubricant passage may include a plug member 74 to substantially prevent lubricant from escaping portion 70 of the lubricant passage. The plug member 74 may comprise any suitable material, such as but not limited to metal, metal alloy, polymer, etc. A sealing member 76, such as an O-ring, may be positioned near the proximal end of the inner tubular portion 66 to prevent lubricant from reaching the hollow interior of the inner tubular portion 66. Similarly, further sealing members may be positioned at other suitable locations to insure that the lubricant is substantially retained within the lubricant passage 64, 70. At the proximal end of the lubricant passage, portion 72 continues to the nut 22. The nut 22 may comprise one or more lubricant passageways 78, which provide access to the internal mechanisms of the nut 22, thereby replenishing lubrication to the screw/nut 22.

Having described various embodiments of an electric actuator, the general mode of operation can be described as follows. When the motor 16 is actuated, the rotor 20 is caused to rotate in a first direction. Because the proximal end of the rotor is connected with the hub 29, which is in turn connected to the screw 21, rotation of the rotor 20 results in corresponding rotation of the screw 21 in the first direction. Because the thrust tube 24 and the nut 22 are prevented from rotating, rotation of the screw 21 relative to the nut 22 causes the nut 22 and the thrust tube 24 to move linearly along the screw 21 in a first linear direction. If the rotor 20 is caused to rotate in the opposite or second direction, the screw 21 is similarly rotated in the opposite or second direction. This results in the nut 22 and the thrust tube 24 being moved linearly in the opposite or second direction. Thus, rotational movement of the rotor 20 results in corresponding linear movement of the thrust tube 24.

To replenish lubrication of the nut 22, any suitable lubrication tool may be attached to access fitting 60. As the lubricant is delivered from the lubrication tool to the access fitting 60, the lubricant may flow from the access fitting 60 through a lubricant passage comprising lubricant passages 62, 64, 70, and 72 to reach one or more lubricant passageways 78 of the nut, thereby lubricating the nut 22.

Although the present invention has been described with reference to preferred embodiments, persons skilled in the art will recognize that changes may be made in form and detail without departing from the spirit and scope of the invention. For example, in one embodiment, the rotor 20 may surround a substantial portion of the screw 21 and is supported by bearing 39. In alternative embodiments, the rotor may include a distal free end, which is unsupported. Thus, the rotor may be cantilevered relative to the hub and extend partially along the length of the actuator.

Similarly, in some embodiments, the thrust tube 24 may include anti-rotation means in the form of a hexagonal exterior configuration, in which the thrust tube 24, with a hexagonal exterior configuration, passes through the end plate of the housing 12 with a hexagonal interior configuration. A bearing member with a hexagonal interior opening may further be mounted within the distal housing member 12 to further guide axial movement of the thrust tube 24 and to preclude rotational movement of the thrust tube 24 and the connected nut 22 relative to the actuator housing. Appropriate seal and scraper means may be associated with the bearing for preventing dust and the like from entering the interior of the actuator.

Additionally, means may be provided for improving the cooling of the actuator motor by providing fluid cooling channels in the stator portion of the motor.

In alternative embodiments yet, the screw 21 may be rotationally fixed, and the nut 22 may be linearly fixed. Thus, rotation of the nut 22 results in axial movement of the screw 21. The lubricant passage can further be adapted to this configuration, such that the nut remains lubricated.

We claim:
1. An electrically powered actuator comprising:
   a housing;
   a rotatable rotor axially fixed relative to the housing;
   an externally threaded elongated screw shaft axially fixed relative to the housing and operably coupled to the rotor and capable of rotating therewith;
   an internally threaded nut rotationally fixed and axially movable relative to the housing, and coupled to the elon- gated screw shaft, such that rotation of the screw shaft causes the nut to move axially relative to the housing;

a load transfer member operatively connected to the nut and axially movable with the nut;

a lubricant access point provided exterior to the housing; and a lubricant passage extending from the lubricant access point, and axially through at least a portion of the load transfer member and to the threaded nut.

2. The electrically powered actuator of claim 1, wherein the housing includes a distal end and a proximal end and the load transfer member includes an extending portion extending axially outwardly beyond the distal end of the housing and wherein the lubricant access point is provided on the extending portion.

3. The electrically powered actuator of claim 2, wherein the load transfer member comprises a thrust tube operably coupled to the nut.

4. The electrically powered actuator of claim 3, wherein the lubricant access point is provided at the distal end of the thrust tube.

5. The electrically powered actuator of claim 4, wherein the distal end of the thrust tube includes a work piece connection member and the lubricant access point is provided at the work piece connection member.

6. The electrically powered actuator of claim 5, wherein the lubricant passage comprises an internal lubricant passage of the thrust tube.

7. The electrically powered actuator of claim 2, wherein the rotor is a hollow rotor.

8. The electrically powered actuator of claim 2, wherein the load transfer member includes a wall portion and the lubricant passage extends axially through at least a portion of the wall portion.

9. The electrically powered actuator of claim 8, wherein the wall portion comprises a generally cylindrical wall portion and the lubricant passage extends axially through at least a portion of the cylindrical wall portion to the nut.

10. An electrically powered actuator comprising a housing with a distal end and a proximal end, a hollow rotor within the housing and rotatable relative to the housing, a threaded lead screw axially located within the hollow rotor, a threaded nut axially movable relative to the housing and operably coupled to the screw, and means for lubricating the threaded nut, including a lubrication member operatively connected to the threaded nut for movement therewith, the lubrication member including an extending portion extending axially beyond the distal end of the housing, a lubrication access point on the extending portion and a lubrication passage extending from the lubrication access point and axially through at least a portion of the lubrication member to the nut.

11. The electrically powered actuator of claim 10, wherein the lubrication member comprises a thrust tube operably coupled to the threaded nut and wherein the lubricant passage extends axially through a wall portion of the thrust tube.

12. The electrically powered actuator of claim 11, wherein the thrust tube comprises:

an elongated, outer hollow tubular portion; and an elongated, inner hollow tubular portion;

wherein the inner tubular portion has a diameter that is less than the diameter of the outer tubular portion, creating the internal lubricant passage of the thrust tube between the outer and inner tubular portions.

13. The electrically powered actuator of claim 12, wherein the threaded nut comprises a lubricant passage which provides access to the internal mechanisms of the threaded nut.

14. The electrically powered actuator of claim 10, wherein the threaded lead screw is operably coupled to the hollow rotor and capable of rotating therewith.

15. An electrically powered actuator comprising:

a housing;

a motor within the housing comprising:

an axially fixed, rotatable hollow rotor;

an axially fixed, externally threaded elongated screw shaft operably coupled to the hollow rotor and capable of rotating therewith;

a rotationally fixed, internally threaded nut coupled to the elongated screw shaft, such that rotation of the screw shaft causes the nut to move axially;

a lubricant access point provided exterior to the housing;

a thrust tube tube operably coupled to the nut, wherein the lubricant access point is provided at the distal end of the thrust tube and wherein the distal end of the thrust tube includes a work piece connection member and the lubricant access point is provided at the work piece connection member; and a lubricant passage extending from the lubricant access point to the threaded nut and comprising an internal lubricant passage of the thrust tube; and wherein the thrust tube comprises:

an elongated outer hollow tubular portion; and an elongated, inner hollow tubular portion;

wherein the inner tubular portion has a diameter that is less than the diameter of the outer tubular portion, creating the internal lubricant passage of the thrust tube between the outer and inner tubular portions.

16. The electrically powered actuator of claim 15, further comprising sealing members to substantially retain lubricant within the lubricant passage.

17. The electrically powered actuator of claim 15, wherein the nut comprises a lubricant passage which provides access to the internal mechanisms of the nut.

18. An electrically powered actuator comprising:

a housing;

a motor within the housing comprising:

an axially fixed, rotatable hollow rotor;

an axially fixed, externally threaded elongated screw shaft operably coupled to the hollow rotor and capable of rotating therewith;

a rotationally fixed, internally threaded nut coupled to the elongated screw shaft, such that rotation of the screw shaft causes the nut to move axially;

a lubricant access point provided exterior to the housing;

a thrust tube tube operably coupled to the nut, wherein the lubricant access point is provided at the distal end of the thrust tube and wherein the distal end of the thrust tube includes a work piece connection member and the lubricant access point is provided at the work piece connection member; and a lubricant passage extending from the lubricant access point to the threaded nut and comprising an internal lubricant passage of the work piece connection member.

* * * * *